ions being easily readable tactually to convey information. A slate for use in forming the cell of the invention includes means to form the reference configuration, and stylus openings around said means.

United States Patent [19]
Kafafian

[11] 3,718,991
[45] March 6, 1973

[54] TACTUALLY INTERPRETABLE CELL AND SLATE FOR FORMING THE SAME

[76] Inventor: Haig Kafafian, 4201 Cathedral Ave. N.W., Washington, D.C.

[22] Filed: Feb. 22, 1971

[21] Appl. No.: 117,544

[52] U.S. Cl..............................................35/38
[51] Int. Cl..............................................G09b 21/02
[58] Field of Search......................35/38, 35 A, 5, 1

[56] References Cited

UNITED STATES PATENTS

| | | | |
|---|---|---|---|
| 1,823,130 | 9/1931 | Smith | 35/5 X |
| 2,892,266 | 6/1959 | Tomkins | 35/5 |
| 2,850,812 | 9/1958 | Mannheimer | 35/38 |

*Primary Examiner*—Wm. H. Grieb
*Attorney*—Bacon & Thomas

[57] ABSTRACT

A tactually interpretable cell including a tactually perceptible reference configuration having one or more tactile positions arrayed in a preselected pattern in proximity to the said reference configuration, the reference configuration and tactually perceptible punctiforms or other forms placed in said tactile positions being easily readable tactually to convey information. A slate for use in forming the cell of the invention includes means to form the reference configuration, and stylus openings around said means.

6 Claims, 8 Drawing Figures

PATENTED MAR 6 1973

3,718,991

INVENTOR
HAIG KAFAFIAN
BY
Bacon & Thomas
ATTORNEYS

TACTUALLY INTERPRETABLE CELL AND SLATE FOR FORMING THE SAME

BACKGROUND OF THE INVENTION

1. Field of Invention

The present invention relates generally to a punctographic communications system and more particularly to a tactile cell that consists of a fixed reference which provides constant feedback that can be easily and accurately maintained as a bearing for touch reading by the blind and other persons, and to a manual or automated slate and other means for use in forming said cell on a piece of material.

2. Description of the Prior Art

Communication by conventional reading and writing is not possible for the blind, and through the years surrogate means of communication have been sought. The New York Point Alphabet, Moon writing and the standard and modified braille tactile communication concepts were the principal punctographic developments to provide reading and writing communication means for the blind, and braille books and other documents are now available to the person with impaired sight. In no instance has a reference configuration been maintained in the prior art, or has it been used.

For example, standard braille is based on a six position cell, tactually perceptible dots being placed in said cell positions according to a set code of Louis Braille who numbered the dot positions of his cell 1-2-3 downward to the left and 4-5-6 downward to the right so that each cell combination of raised dots represents a given pattern which depending on its context has more than one meaning. By scanning the tactually perceptible braille cells with the fingertips, a skilled blind person can touch read in context what has been written in braille in a tactile rather than a visual manner that a sighted person uses to read alphabet or other writing. While the invention and use of standard braille has been of great benefit to mankind, and the blind in particular, the system has several deficiencies.

One of the principal problems with standard braille, especially for an unskilled or beginning reader, is that the multiplicity of unsymmetrical tactile dots required to convey information makes many of the individual patterns difficult to recognize tactually. Another serious constraint is that the six position standard braille cell provides only 63 possible dot combinations which necessitates use of a single pattern for more than one meaning. Still another shortcoming of the standard braille cell is that 31 of the patterns are ambiguous. In addition, it is sometimes confusing for beginners to determine which tactile dots comprise a given cell and erroneous pattern interpretation are made from dots contained in adjacent columns of two adjacent cells as themselves constituting a cell.

The need thus exists for an punctographic communications system, one in which each combination can be easily and unequivocally written and read, and wherein the reader can clearly identify which pattern formations belong to a predetermined code and assigned meaning. In addition, there is need for a punctographic system for the large population of blind individuals who cannot use standard or modified braille or other punctographic means, that provides a substantially greater number of unequivocal cell combinations than is possible with standard braille. The present invention is addressed to these needs.

SUMMARY OF THE INVENTION

The tactile cell of the present invention is based on the use of a constant feedback of a stable or fixed tactile reference which is critical to an easily readable, tactually perceptible pattern whose dots or other shaped tactile markings are in proximity to it. In one embodiment of the invention sixteen tactile positions are disposed in proximity to the reference configuration, which, if all possible combinations are utilized, would yield 65,536 unique tactile patterns.

In actual practice, it is recognized that thousands of patterns are excessive and would be difficult to read or memorize and in practice it is desirable to limit the number of patterns available to those which are the most legible to the tactile reader. Hence, more than the necessary number of different unequivocal tactile combinations are available in the present invention and they are orders of magnitude greater than that available from six dot standard braille or other punctographic systems and each pattern available in the present invention is unambiguous.

The basic reference configuration contained in the present tactile cell provides a ready means for the reader to accurately locate the cell even when large numbers of cells are spaced closely together. The sixteen tactile positions in proximity to the reference configuration provides the basis for numerous patterns which can be easily identified tactually once the reference configuration is sensed, so that even a relatively unskilled blind person can successfully read using the reference provided in the tactile cell of the invention.

The present invention also includes a slate for use in forming the tactile cell, the slate including a face plate having means on the reverse side thereof to form a reference bar for the cell. The plate has stylus openings on either side of the reference configuration, shaped to provide discrete locations for the insertion of a stylus to form the tactile dots or other configurations.

It is the principal object of the present invention to provide an unambiguous tactile cell that can be easily identified and tactually read, and which provides a large number of unequivocal tactile combinations.

Another object is to provide a slate for use in forming the tactile cell of the invention on a piece of material.

A further object is to provide a tactile cell that can be used not only by a trained reader, but by an unskilled person to tactually convey information.

Still another object is to provide a tactile cell with a reference configuration which may be in a horizontal, vertical or other fixed position in the cell whereby the discrete location of the cell and of the tactile positions therein can be immediately and unequivocally determined tactually and by other means.

Other objects and many of the advantages of the present invention will become readily apparent from the following Description of the Preferred Embodiment, when taken together with the accompanying drawings.

DESCRIPTION OF THE PREFERRED EMBODIMENT

Figure 3:
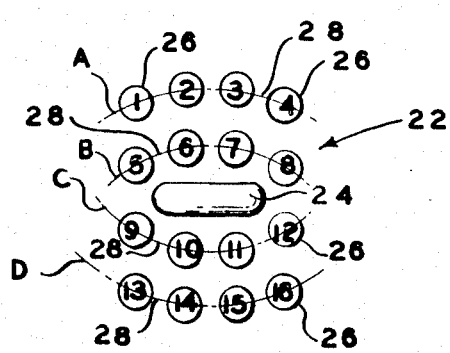
FIG. 3 is a diagrammatic representation of the cell structure of FIG. 1, showing sixteen tactile positions and the manner in which they are arranged along curved axes about the reference bar.

Referring now to FIG. 3 of the drawings, there is shown at 22 a first embodiment of the tactile cell of the invention. The tactile cell 22 includes a horizontal, tactually perceptible reference configuration 24, above and below which are located eight tactile positions 26. The tactile positions 26 are numbered successively from left to right in FIG. 3, beginning at the upper left corner of the upper array of eight positions with number 1, and the 16 positions 26 are arranged in rows A, B, C and D of four positions each on concentric curved axes 28.

The axes 28 are positioned symmetrically of the reference bar 24 so that they curve inwardly toward the longitudinal axis of said bar, and are spaced from each other and from the reference bar. The sixteen tactile positions 26 are spaced from each other, and the length of the reference bar 24 is chosen so that the endmost tactile positions 1, 4, 5, 8, 9, 12, 13 and 16 lie outwardly of the bar.

Obviously, by placing tactile dots in different ones of the sixteen tactile positions 26 of FIG. 3, different discrete unequivocal tactile patterns can be obtained. By compiling a code relating each different tactile position to a specific assigned meaning or information, such as a letter of the alphabet, a punctuation character, a number, a mathematical, musical or other symbol, or even a phrase, sentence or other item of information, an organized tactile language system can be created. Unlike in standard braille, a nearly unlimited host of possible tactile patterns all of which are unambiguous are available from the sixteen tactile positions and reference configurations.

Referring again to FIG. 3, a more detailed analysis of how the tactile positions 26 numbered 1 through 8 are placed relative to the reference configuration 24 will indicate the ease with which the tactile cell 22 can be read. The tactile positions 26 numbered 1 and 5 are disposed slightly beyond the left end of the reference configuration 24, and the tactile positions 26 numbered 4 and 8 are similarly disposed relative to the right end of said reference configurations, facts which a person can easily determine tactually. It is also an easy matter to tactually discern between the tactile positions 26 numbered 5 and 8, which are close to the reference configuration 24, and the positions 1 and 4 that lie farther away.

Turning to the four central tactile positions 26, the positions 2 and 6 are disposed centrally above the left half of the reference configuration 24, and the positions 3 and 7 are similarly disposed above the central portion of the right half of said reference configuration. Again, it is easy to discern between the tactile positions 26 which are close to and those which are spaced farther from the reference configuration. By use of the reference configuration 24, then, and by positioning the eight tactile positions 26 numbered 1 through 8 as shown in FIG. 3, a reader can easily and accurately read a given tactile pattern. The clear and readily discernible differences between patterns provides a more unequivocable reading than is possible with any punctographic system which does not display a feedback reference configuration as introduced in the present invention.

The lower eight tactile positions 26 numbered 9 through 16 are, of course, arrayed similarly to and can be read like the positions 26 above the reference configuration.

To provide maximum readability, it is preferable to use patterns which are the most legible such as one, two, three, four and symmetrical cluster arrangements. But these preferences, it must be emphasized, need not be followed, and when they are followed still result in an abundance of available code combinations which are possible because of the reference configuration provided in this invention.

The reference configuration 24 and the tactile dots placed in the positions 26 can, of course, be either raised, depressed or be of different texture, and of varying shapes and forms, to suit the tactile need at hand. The characters can be formed on braille paper, or elsewhere. Indeed, because of the rich number of unambiguous patterns available, the present cell can also be used in dark passageways, throughfares, on machines, equipments and nautical vessels, space vehicles or elsewhere to give information to individuals both those with sight and those without and to automata. For this purpose a code relating specific characters to specific instructions, for example can be worked out.

Figure 1:
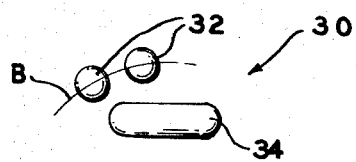
FIG. 1 is a pictorial representation of one embodiment of the tactile cell of the invention, wherein two tactile dots are utilized.

A typical two dot, raised tactile cell using the array of FIG. 3 is shown at 30 in FIG. 1, and consists of a reference bar 34 and tactile dots 32 placed in tactile positions 5 and 6. The curved arrays of FIGS. 1 and 3 are designed for ease of tactual reading, but, of course, other arrangements are possible.

Figure 2:
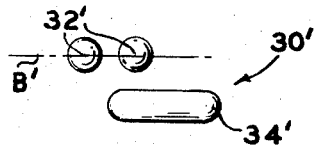
FIG. 2 is a pictorial representation similar to FIG. 1, but showing a cell wherein the tactile dots are differently arranged.
Figure 4:
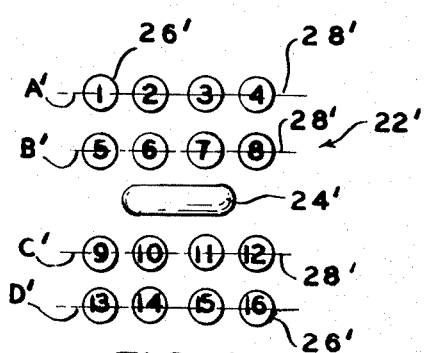
FIG. 4 is a diagrammatic view similar to FIG. 3, showing the structure of the tactile cell of FIG. 2.

Referring to FIG. 4, a tactile cell 22' is shown including a reference bar 24', and four rows A', B', C' and D' of four tactile positions 26' each, the rows being arranged on spaced axes 28' that are parallel to each other and to the longitudinal axis of the reference bar 24'. Tactually perceptible dots placed in the positions 26' are read as in FIG. 3, and a raised configuration tactile cell 30' is shown in FIG. 2 that has the same meaning or code value as the cell 30 of FIG. 1.

Obviously, other variations in arranging the 16 tactile positions are feasible, and indeed in some instances fewer or more tactile positions might prove desirable depending on the particular application.

Figure 5:
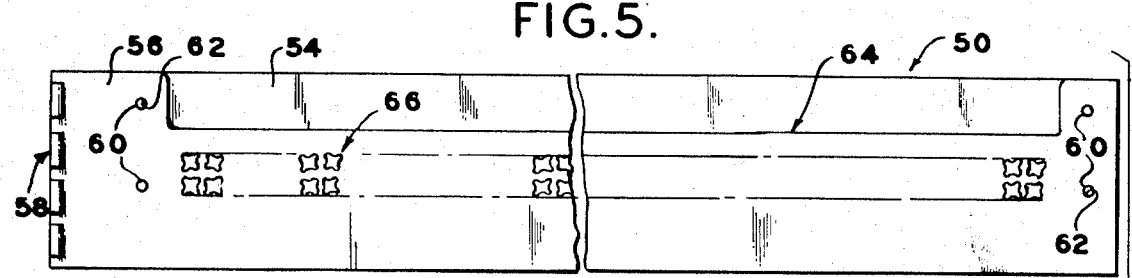
FIG. 5 is a fragmentary, plan view of the slate of the invention, together with a stylus for use therewith.
Figure 6:
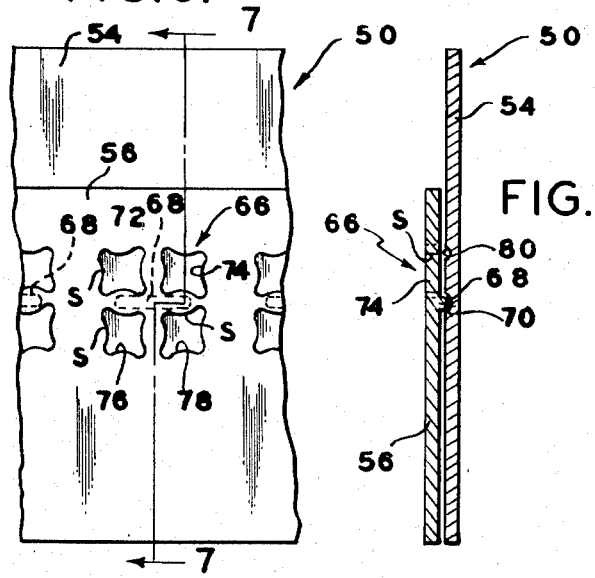
FIG. 6 is an enlarged, fragmentary view of the face plate of the slate in FIG. 5, showing the stylus openings and the discrete positions for receiving a stylus, whereby to form a tactile cell according to the pattern of FIGS. 1 and 3.
Figure 7:
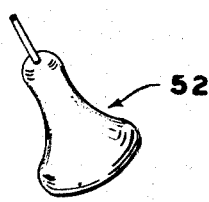
FIG. 7 is a vertical sectional view taken on the line 7-7 of FIG. 6, showing the stylus structure for forming the reference configuration.

Turning now to FIGS. 5–7, there is shown a slate 50 and a braille stylus 52 for use in forming the tactile cell of the invention on plain or braille paper, or the like. The slate 50 is of the reverse writing type, wherein the tactile formation is pressed into the sheet from the reverse side, and includes a rectangular base plate 54 having a face plate 56 connected thereto by a hinge 58. Four positioning pins 60 project upwardly from the base plate 54 and are snugly received in holes 62 in the face plate 56, the pins 60 serving both to help position a sheet of material, and to hold the slate in a closed position.

The upper edge of the face plate 56 has a rectangular notch 64 therein, of a size generally corresponding to a complete row of tactile cell characters. Extending beneath and parallel to the bottom edge of the notch 64 is a row of tactile cell stylus guides 66.

Each stylus guide 66 includes a raised elongated boss 68 on the reverse side of the face plate 56, the base plate 54 having a mating depression 70 for each boss 68. The bosses 68 and the depressions 70 are the means for forming reference bars 24 in a sheet of material. To accomplish this, pressure is placed on the face plate 56 after a sheet of material has been placed between the two plates, whereby the reference bars for a whole row of tactile cells 22 are made.

Disposed above each boss 68 is a pair of spaced openings 72 and 74, a similar pair of openings 76 and 78 being disposed beneath the boss. The four corners of the opening 72 correspond to the tactile positions 1, 2, 5 and 6 of the tactile cell 22, the sides S of the opening bowed inwardly between the rounded corners to aid in guiding the point of the stylus 52 into the correct position. The openings 74, 76 and 78 are shaped similarly to the opening 72, and the corners thereof correspond to the remainder of the tactile positions of the cell 22. The base plate 54 has a rounded depression 80 beneath each corner of each of the openings 72, 74, 76 and 78, to cooperate with the point of the stylus 52 for forming a tactile dot.

Figure 8:
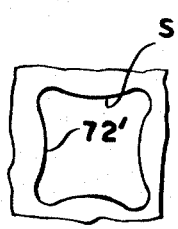
FIG. 8 is an enlarged view of a slate stylus opening for use in forming the tactile cell pattern of FIGS. 2 and 4.

Referring now to FIG. 8, a modified opening 72' is shown, for use in forming the tactile cell 22'.

While the slate 50 is of the reverse writing type, it is obvious that a positive writing slate can also be constructed, as in the instance of standard braille. The positions of the boss 68 and the recess 70 would then be reversed, the depressions 80 would be replaced with raised dots, and a stylus 52 with a rounded, hollow point would be used.

Other slate variations can also be devised.

The tactile cell of the invention, and the slate 50, are seen to satisfy all of the objects set forth hereinabove. Obviously, many modifications and variations thereof are possible.

I claim:

1. A tactually interpretable cell for reading and writing a punctoform language comprising: a tactually perceptible reference configuration; and a plurality of tactile positions arrayed in a preselected pattern on the opposite sides of and spaced from said reference configuration for receiving tactually perceptible dots, or other forms, none of said positions being in alignment with said reference configuration, and each of said positions having a specific unique and unequivocal relationship to said reference configuration for tactually indicating specific information in accordance with a predetermined code.

2. A tactually interpretable cell as recited in claim 1, wherein there are sixteen tactile positions in proximity of said reference configuration.

3. A tactually interpretable cell as recited in claim 2, wherein said sixteen tactile positions are arranged in four rows consisting of four positions each, said rows being parallel to each other and to the longitudinal axis of said reference configuration.

4. A tactually interpretable cell as recited in claim 2, wherein said sixteen tactile positions are arranged on two concentric curved axes which are spaced from each other and from said reference configuration, the opposite ends of said curved axes bowing toward the longitudinal axes of said reference configuration.

5. A slate for use in forming at least one tactually interpretable cell on a piece of material, said slate including a face plate having on the reverse side thereof at least one means for use in forming a reference configuration on said piece of material, said face plate having at least one stylus opening therein positioned adjacent said reference configuration forming means, each of said stylus openings defining a plurality of discrete tactile positions for receiving and guiding a stylus, said positions defined by said stylus openings being arrayed on the opposite sides of and in proximity to, but not in alignment with, said reference configuration forming means.

6. A slate as recited in claim 6, including additionally a base plate connected with said face plate, said base plate having means thereon for cooperating with said means on said face plate to form said reference configuration, and a stylus receiving means positioned beneath each of said discrete tactile positions defined by said stylus openings.

* * * * *